Aug. 4, 1959 J. W. HARDY 2,897,564
TENSION MECHANISM FOR AN EXTENSIBLE CONVEYOR
Filed March 5, 1956 2 Sheets-Sheet 1
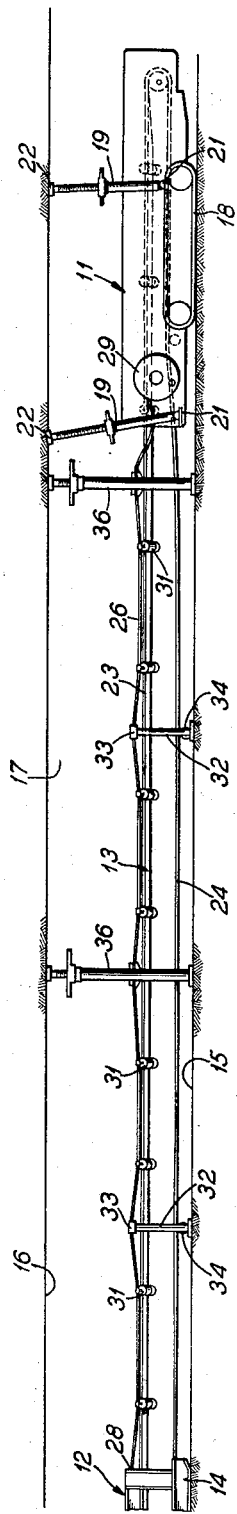
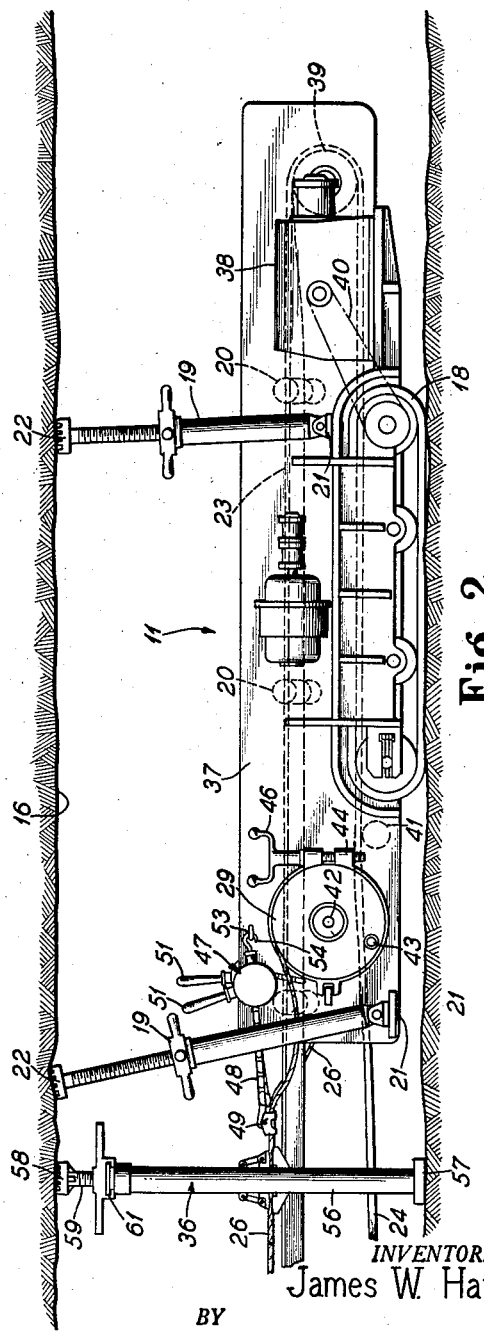
INVENTOR.
James W. Hardy
BY
Murray A. Gleeson
ATTORNEY INVENTOR.
James W. Hardy
BY
Murray A. Gleeson
ATTORNEY

United States Patent Office

2,897,564
Patented Aug. 4, 1959

2,897,564

TENSION MECHANISM FOR AN EXTENSIBLE CONVEYOR

James W. Hardy, Chicago, Ill., assignor to Goodman Manufacturing Company, Chicago, Ill., a corporation of Illinois Application March 5, 1956, Serial No. 569,559

1 Claim. (Cl. 24—134)

This invention relates generally to extensible belt conveyors, and more particularly to a belt conveyor of the type where the conveying reach is supported upon spaced flexible strands.

According to the present invention the conveyor belt is arranged for orbital movement between movable head and tail sections, the tail section receiving material and following the advance of a continuous miner. The conveyor belt has a storage loop which shortens as the tail section advances, and in order to support the additional length of conveying reach the tail section pays out additional lengths of flexible strands. These strands are tied off at intervals between the mine floor and roof at a desired tension to reduce sag of the conveying reach, and the tail section is provided with means for tensioning the lengths of flexible strand between the last inby tie-off point and the tail section.

With the foregoing considerations in mind it is a principal object of the invention to provide an improved extensible belt conveyor of the type employing flexible strands for supporting the conveying reach, wherein the support strands are properly tensioned and tied off at intervals throughout the length thereof.

Another object is to provide a structure for supporting the flexible strands, which structure will function to maintain desired degree of tension of the support strands between each such structure.

Other objects and important features of the invention will be apparent from a study of the specification following taken with the drawings which together show a preferred embodiment of the invention and what is now considered to be the best mode of practicing the principles thereof. Other embodiments may be suggested to those having the benefit of the teachings herein, and such other embodiments are intended to be reserved especially as they fall within the scope and spirit of the subjoined claim.

In the drawings:

Fig. 1 is a side elevation view of an extensible belt conveyor having the improvements according to the present invention embodied therein;

Fig. 2 is a side elevation view of the tail section of such a conveyor to an enlarged scale as compared with Fig. 1, and showing details of means for storing the flexible support strands for the conveying reach of the conveyor, and showing also means for imposing and tieing off the tension in such support strands;

Figure 3:
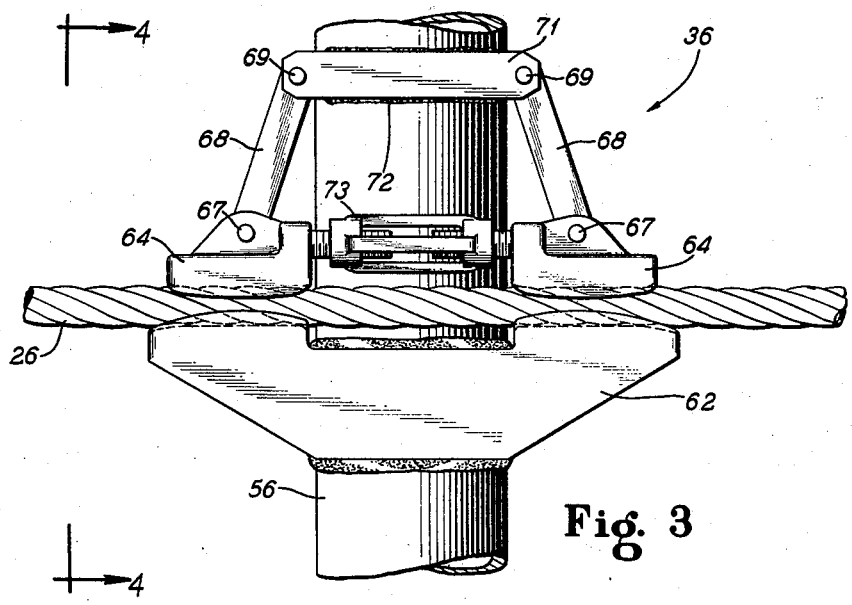
Fig. 3 is a side elevation view, to an enlarged scale as compared with Fig. 1, of a portion of one of the support standards for the flexible strands of the conveyor seen in Fig. 1.

Referring now to Fig. 1 of the drawings, there is shown a tail section 11 and a head section 12 of an extensible conveyor having a conveyor belt 13 trained for orbital movement therebetween. The head section 12 may be mounted upon a skid 14, which is held in positions by jacks, not shown, extending between the skid 14 and the roof 16 of an entry 17. The head section 12 is provided with a belt storage loop, not shown, which may be of the type as is shown in Hardy et al. application, Serial No. 541,162, filed October 18, 1955, for Extensible Conveyor.

The tail section 11 is mounted for movement upon crawler treads 18 in following the advance of a mechanical miner or the like. The tail section 11 is held in position by means of jacks 19 having their lower ends 21 jacked against the tail section 11 and having their upper ends 22 jacked against the roof 16 in the manner shown.

The conveyor belt 13 includes a conveying reach 23 and a return reach 24. The conveyor reach 23 is supported upon a pair of spaced flexible strands 26 connected at their outby end 28 to the outby or head section 12, the inby end of the each flexible strand being wound upon a storage drum 29.

The two spaced flexible strands 26, 26 are spanned by troughing roller assemblies 31 disposed at desired intervals throughout the length thereof. As seen in Fig. 1, the flexible strands 26 are supported at intervals throughout their length upon support standards 32 having an upper saddle 33 for the support strands 26 and supporting a return roller 34 for the return reach 24.

In order to support the conveying reach 23 without an undue amount of sag under load the flexible strands 26 are maintained at a desired tension. The tension in each strand is "tied-off" at intervals by support structures 36 for the strands which extend between the floor 15 and the roof 16 of the entry 17. As will be described in further detail as this specification proceeds, each of the support structures 36 is provided with means to grip the support strands 26 after the strand is first tensioned to a desired value, and to transmit the reaction caused by such tension into the roof 16 and the floor 15.

Referring now to Fig. 2 of the drawings, the tail section 11 consists of side frame members 37 which are mounted upon the crawler treads 18. These crawlers treads are driven from a motor 38 mounted on each side of the side frame member 37 through a sprocket chain 40.

The conveying reach 23 is supported upon the troughing roller assemblies 20 extending between the side frame plates 37. The conveying reach 23 is reversed in direction around an idler pulley 39 supported between the side frames 37, and the return reach 24 may be additionally supported on an idler roller 41.

The storage reel 29 is mounted on the outside of each side frame 37 and is supported upon a stub shaft 42. The storage reel 29 is turned by hand by the crank 43 and it can be locked in position by means of a band brake 44, the engagement thereof being controlled by a hand operated screw 46.

Means are provided at the tail section 11 for imposing tension on each flexible strand 26, the tension thereafter being "tied-off" at the supports 36. When the tail section 11 has advanced sufficiently to require the positioning of a support 36, tension is placed on the flexible strand 26 between the tail section 11 and the next inby already positioned support 36.

Tensioning of the strand 26 is achieved by a device known generally in the mining art as a "comealong" 47. The "comealong" 47 includes a chain 48 having a grapple 49 to the strand 26. The "comealong" includes a handle 51, which through a ratchet and pawl arrangement, not shown, pulls on the chain 48. The "comealong" 47 is anchored at 53 to the side frame 37, there being a hook 54 thereon.

Figure 4:
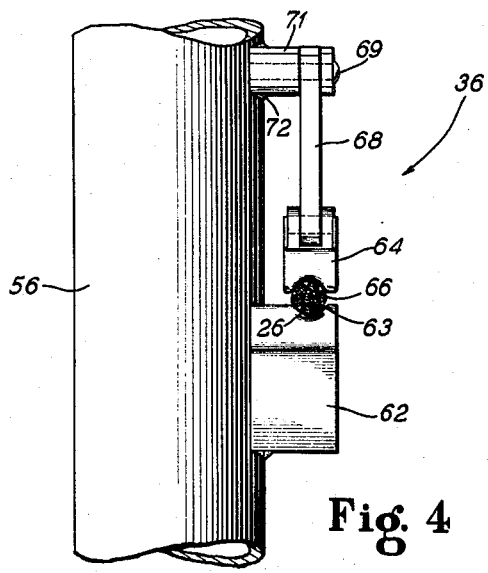
Fig. 4 is a fragmentary side view of one of the support standards seen in Fig. 3, said view being taken in the direction of the arrows 4—4 of Fig. 3.

Referring now to Figs. 3 and 4 of the drawings, the standard 36 is in the form of a tubular column 56 having a foot 57 engaging the mine floor 15 and an upper adjustable jacking pad 58 mounted upon a screw 59 which is raised and lowered by means of a nut 61, in a manner well known in the art.

The support standard 36 includes means whereby the tension in the support strand 26 can be tied-off, and the reaction thereof transmitted into the roof 16 and the floor 15. To this end the support standard 36 is provided with a saddle 62 having an upper semi-circular groove 63 therein to receive the support strand 26. The support strand 26 is engaged under tension between the lower saddle 62 and an upper pressure shoe 64 also having a semi-circular groove 66 conforming to the diameter of the strand 26. Each shoe 64 is mounted in inby and outby directions of the standard 36, and each is pivoted at 67 to a link 68 pivoted at its other end 69 to an abutment member 71 welded at 72 to the cylindrical pipe 56.

When a support standard 36 is installed, the two shoes 64 are moved to a released position by the turn buckle 73. The strand 26 is then placed in the groove 63, upon which tension is placed on the strand 26 by means of the "comealong" 47. When the desired tension is reached, the strand 26 is "tied-off" by adjusting the turn buckle 73 tightly to grip the strand 26.

In Fig. 3, should an inordinate amount of tension be placed on the strand 26 to the left of the standard 36, the pull to the left will tend to rock the right hand link 68 in a clockwise manner to cause more firm engagement between the shoe 64 connected thereto and the strand 26. Conversely, an inordinate amount of tension to the right will tend to rock left hand link 68 in a counter-clockwise manner, with the same resultant effect.

It will be seen that the standards 36 form a means of taking the reactive forces of the length of strand between each standard.

While the invention has been described in terms of a preferred embodiment thereof its scope is intended to be limited only by the claim here appended.

I claim as my invention:

A structure of the class described for taking a reactive force from a flexible strand supporting the load conveying reach of an endless belt conveyor comprising a support standard having opposed portions engageable with opposite surfaces of a mine seam and the like, a saddle supported on said standard and adapted to receive a flexible strand, and means for maintaining such flexible strand in said saddle at a desired tension on said strand including a pair of shoes spaced from each other along said strand, a pair of links each pivotally connected between one of said shoes and said support standard, said links being angularly disposed relative to one another, and a turnbuckle connected between said shoes and effective to force said shoes against the strand by movement of said shoes relative to each other.

References Cited in the file of this patent

UNITED STATES PATENTS

| | | |
|---|---|---|
| 546,217 | Armstrong | Sept. 10, 1895 |
| 1,748,301 | McKinlay | Feb. 25, 1930 |
| 1,828,801 | Finlayson | Oct. 27, 1931 |